(12) United States Patent
Morita et al.

(10) Patent No.: US 10,223,047 B2
(45) Date of Patent: Mar. 5, 2019

(54) PRINT APPARATUS AND METHOD FOR CONTROLLING PRINT APPARATUS BASED ON REGIONAL INFORMATION OF WIRELESS ADAPTORS

(71) Applicant: SEIKO EPSON CORPORATION, Tokyo (JP)

(72) Inventors: Tsubasa Morita, Shiojiri (JP); Yasuhiro Ikeyoshi, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/603,032

(22) Filed: May 23, 2017

(65) Prior Publication Data

US 2017/0344319 A1    Nov. 30, 2017

(30) Foreign Application Priority Data

May 24, 2016   (JP) .................................. 2016-103571

(51) Int. Cl.
*G06F 3/12* (2006.01)
*G06K 15/00* (2006.01)
*H04W 88/00* (2009.01)

(52) U.S. Cl.
CPC .......... *G06F 3/1236* (2013.01); *G06F 3/1209* (2013.01); *G06F 3/1286* (2013.01); *G06F 3/1292* (2013.01); *G06K 15/405* (2013.01); *H04W 88/00* (2013.01)

(58) Field of Classification Search
None
See application file for complete search history.

(56) References Cited

U.S. PATENT DOCUMENTS

| | | | |
|---|---|---|---|
| 2003/0073438 A1 | 4/2003 | Fukushima et al. | |
| 2007/0058031 A1* | 3/2007 | Aizawa .............. | H04N 1/00204 348/14.01 |
| 2009/0075594 A1* | 3/2009 | Shichino ............. | H04L 12/2803 455/41.3 |
| 2011/0002271 A1 | 1/2011 | Ogata et al. | |
| 2014/0300915 A1 | 10/2014 | Ishikura | |

(Continued)

FOREIGN PATENT DOCUMENTS

| | | |
|---|---|---|
| CN | 103958210 A | 7/2014 |
| JP | 2003-111123 A | 4/2003 |

(Continued)

*Primary Examiner* — Henok Shiferaw
(74) *Attorney, Agent, or Firm* — Foley & Lardner LLP

(57) ABSTRACT

A print apparatus configured to connect a plurality of wireless LAN adapters which can store regional information indicating a region, the print apparatus includes a print mechanism configured to print on a print medium; a plurality of USB ports to which the wireless communication adapters configured to be connected; and a processor configured to acquire the regional information items from the plurality of connected wireless LAN adapters in a case of detecting that the wireless LAN adapters are in a state of being connected to the plurality of USB ports and executes use adapter control processing which sets all the wireless communication adapters to be in an unusable state in a case where any one of a plurality of items of the regional information indicating the region are different from others, based on a result of comparison of the plurality of acquired regional information items to each other.

17 Claims, 4 Drawing Sheets

(56) References Cited

U.S. PATENT DOCUMENTS

2014/0330971 A1* 11/2014 Kurose .................. H04L 47/00
  709/225
2017/0064116 A1   3/2017 Ishikura
2017/0302813 A1  10/2017 Ishikura

FOREIGN PATENT DOCUMENTS

| JP | 2004-260714 A | 9/2004 |
| JP | 2011-011462 A | 1/2011 |
| JP | 2012-169719 A | 9/2012 |
| JP | 2014-220596 A | 11/2014 |

* cited by examiner

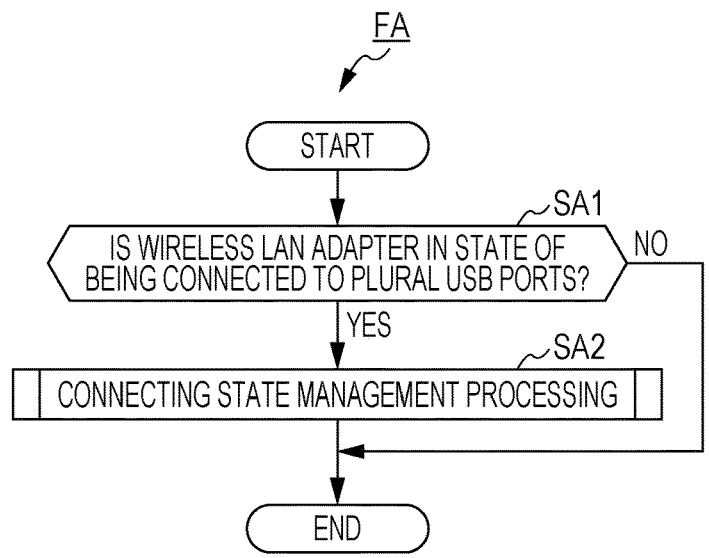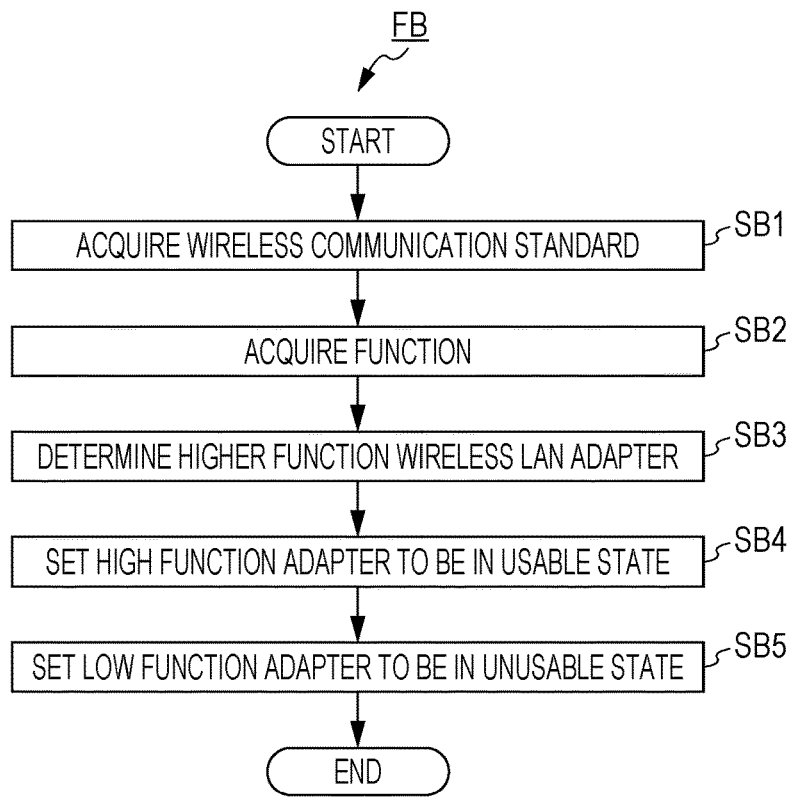

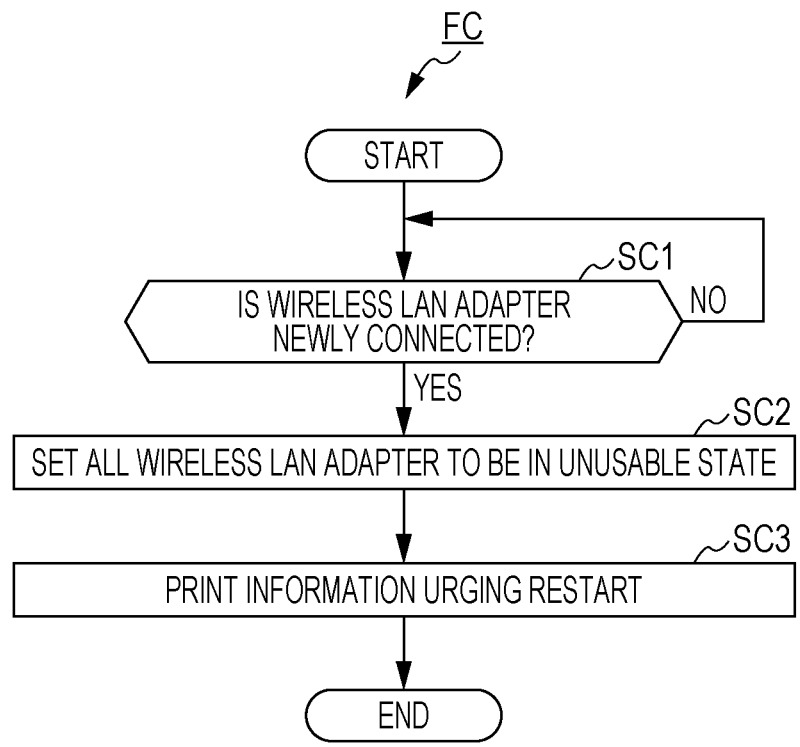

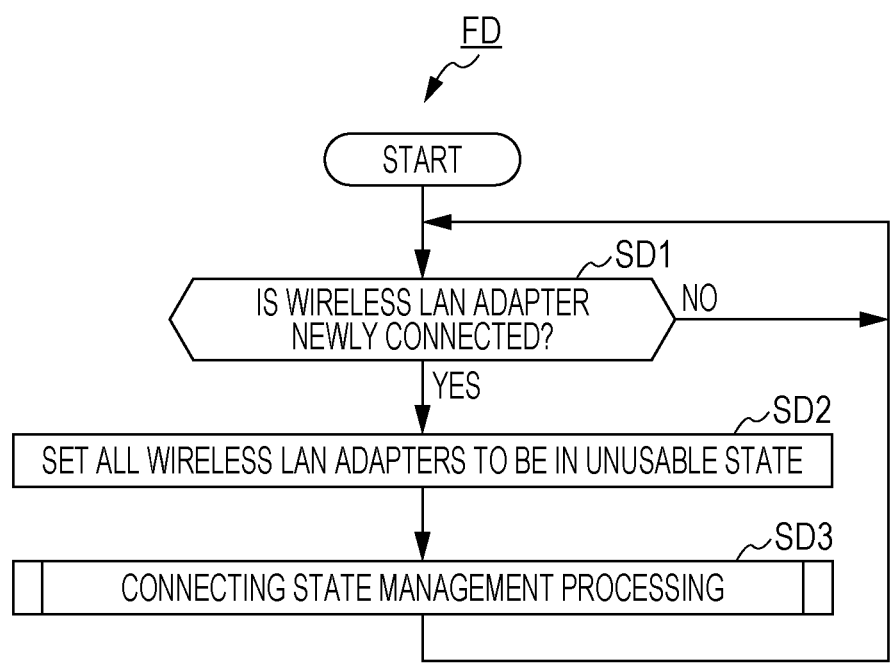

PRINT APPARATUS AND METHOD FOR CONTROLLING PRINT APPARATUS BASED ON REGIONAL INFORMATION OF WIRELESS ADAPTORS

This application claims priority under 35 U.S.C. § 119 to Japanese Patent Application No. 2016-103571 filed on May 24, 2016, the entire disclosure of which is expressly incorporated by reference herein.

BACKGROUND

1. Technical Field

The present invention relates to a print apparatus and a method for controlling the print apparatus.

2. Related Art

In the related art, there is known a print apparatus (printer) on which a wireless communication adapter (wireless dongle) is mounted and which wirelessly communicates with the wireless communication adapter (see, for example, JP-A-2011-11462).

Here, in a case where a plurality of connectors to which a wireless communication adapter can be connected are provided in the print apparatus, a state where a plurality of wireless communication adapters are connected to the print apparatus can be obtained. In addition, in a case where the print apparatus performs wireless communication via the wireless communication adapter, the wireless communication has to be performed according to a predetermined standard related to the wireless communication in a region where the print apparatus is installed. For example, in a case where a usable electric wave band is defined by a standard for each region and the print apparatus performs wireless communication via the wireless communication adapter, wireless communication has to be performed by an electric wave band defined by the standard being used.

SUMMARY

An advantage of some aspects of the invention is to provide a print apparatus to which a wireless communication adapter configured to be able to be connected and which suppresses performance of wireless communication in violation of a standard of a region in which the print apparatus is installed, in response to a possibility that a plurality of wireless communication adapters are connected.

According to an example of the invention, there is provided a print apparatus configured to be able to connect a plurality of wireless communication adapters in which regional information displaying a region can be stored, the print apparatus including: a print mechanism configured to print on a print medium; a plurality of connectors to which the wireless communication adapters configured to be able to be connected; and a processor (a control unit) configured to be able to acquire the regional information items from the plurality of connected wireless communication adapters in a case of detecting that the wireless communication adapters are in a state of being connected to the plurality of connectors and executes use adapter control processing which sets all the wireless communication adapters to be in an unusable state in a case where the acquired regional information items are compared with each other and thus any one of a plurality of items of the regional information is different from others.

Here, in a state where the wireless communication adapter of which regional information indicating the region are different from each other is connected to the print apparatus, there is a high possibility that any of the wireless communication adapters is erroneously connected and it is not possible to properly select which wireless communication adapter should be used. Based on this, according to the configuration of the invention, in a case where the wireless communication adapter of which regional information indicating the region are different from each other is in a state of being connected to the print apparatus, performance of the wireless communication by the print apparatus can be reliably prevented in an aspect in violation of a standard by all the wireless communication adapters being set to be in an unusable state. In other words, according to the configuration of the last portion of the invention, in the print apparatus which can be connected to the wireless communication adapter, it is possible to suppress performance of the wireless communication in violation of a standard of a region in which the print apparatus is installed, in response to the possibility that a plurality of wireless communication adapters can be connected.

In addition, in the print apparatus according to the invention, in the use adapter control processing, in a case where the wireless communication adapter is set to be in an unusable state, the processor may control the print mechanism to print information indicating that the wireless communication adapter cannot be used since the regional information items of the plurality of wireless communication adapters is different from each other on the print medium.

According to the configuration of the invention, a user can quickly recognize that the print apparatus of which region is different is in a state of being incapable of communicating with an external apparatus via the wireless communication adapter by checking information printed on the print medium by visual recognition and reason thereof and can execute suitable processing such as disconnection of a predetermined wireless communication adapter and restart of the print apparatus based on the recognition.

In addition, in the print apparatus according to the example of the invention, the processor may execute the use adapter control processing in a case of detecting that the wireless communication adapters are respectively in a state of being connected to the plurality of connectors at the time of start.

According to the configuration of the example of the invention, in a case where the print apparatus is started in a state where a plurality of wireless communication adapters are connected, the print apparatus executes the use adapter control processing at the time of start and thus performance of wireless communication can be prevented in an aspect in violation of a standard in a predetermined state.

In addition, in the print apparatus according to the example of the invention, the processor may monitor whether or not the wireless communication adapter is newly connected to the connector while the wireless communication adapter is in a state of being connected to one connector and may execute the use adapter control processing in a case of detecting that the wireless communication adapter is newly connected.

According to the configuration of the example of the invention, in a case where the wireless communication adapter is newly connected to the print apparatus while the print apparatus is started, performance of the wireless communication can be prevented in an aspect in violation of a standard in a predetermined case by the use adapter control processing being executed at the time of the connection.

In addition, in the print apparatus according to the example of the invention, in a case where the processor detects that the plurality of wireless communication adapters having the same regional information are in a connected state, any of the wireless communication adapters may be set to be in a usable state and the other wireless communication adapters may be set to be in an unusable state.

According to the configuration of the example of the invention, in the print apparatus, occurring of a problem due to the connection of a plurality of wireless communication adapters in an unusable state can be prevented.

In addition, in the print apparatus according to the example of the invention, in a case of detecting that the plurality of wireless communication adapters having the same regional information are in connected states, the processor may acquire information related to a wireless communication function of each wireless communication adapter, may compare the acquired information of the plurality of wireless communication adapters to each other, and thus a higher function wireless communication adapter may be set to be in a usable state and the other wireless communication adapters may be in an unusable state.

According to the configuration of the example of the invention, the print apparatus can communicate with an external apparatus via a high function wireless communication adapter suitable for use in communication.

In addition, in the print apparatus according to the example of the invention, in a case where the wireless communication adapter is set to be in an unusable state, the processor may stop the supply of electric power to the wireless communication adapter.

According to the configuration of the example of the invention, unnecessary power consumption can be suppressed and power saving can be realized.

In addition, in the print apparatus according to the example of the invention, in a case where the wireless communication adapter is set to be in an unusable state, the processor may stop allocation of a resource to the wireless communication adapter.

According to the configuration of the example of the invention, unnecessary consumption of a resource can be suppressed.

According to the example of the invention, there is provided a method for controlling a print apparatus configured to include a print mechanism configured to print on a print medium and a plurality of connectors to which a wireless communication adapter, in which regional information indicating a region can be stored, can be connected, the method including: acquiring the regional information items from a plurality of connected wireless communication adapters in a case where it is detected that a wireless communication adapter is in a state of being connected to the plurality of connectors; comparing a acquired regional information items to each other; and executing use adapter control processing which sets all the wireless communication adapters to be in an unusable state in a case where any one of a plurality of items of the regional information is different from others.

According to the configuration of the example of the invention, in a case where the wireless communication adapter of which regional information indicating the region are different from each other is in a state of being connected to the print apparatus, performance of the wireless communication by the print apparatus can be reliably prevented in an aspect in violation of a standard by all the wireless communication adapters being set to be in an unusable state. In other words, according to the configuration of the last portion of the invention, in the print apparatus which can be connected to the wireless communication adapter, it is possible to suppress performance of the wireless communication in violation of a standard of a region in which the print apparatus is installed, in response to the possibility that a plurality of wireless communication adapters can be connected.

BRIEF DESCRIPTION OF THE DRAWINGS

One aspect of the invention will be described with reference to the accompanying drawings, wherein like numbers reference like elements.

FIG. 2 is a flowchart illustrating operation of a print apparatus.

FIG. 3 is a flowchart illustrating the operation of the print apparatus.

FIG. 4 is a diagram illustrating an example of information which is printed on a print medium.

FIG. 5 is a flowchart illustrating the operation of the print apparatus.

FIG. 6 is a flowchart illustrating the operation of the print apparatus.

DESCRIPTION OF EXEMPLARY EMBODIMENTS

Figure 1:
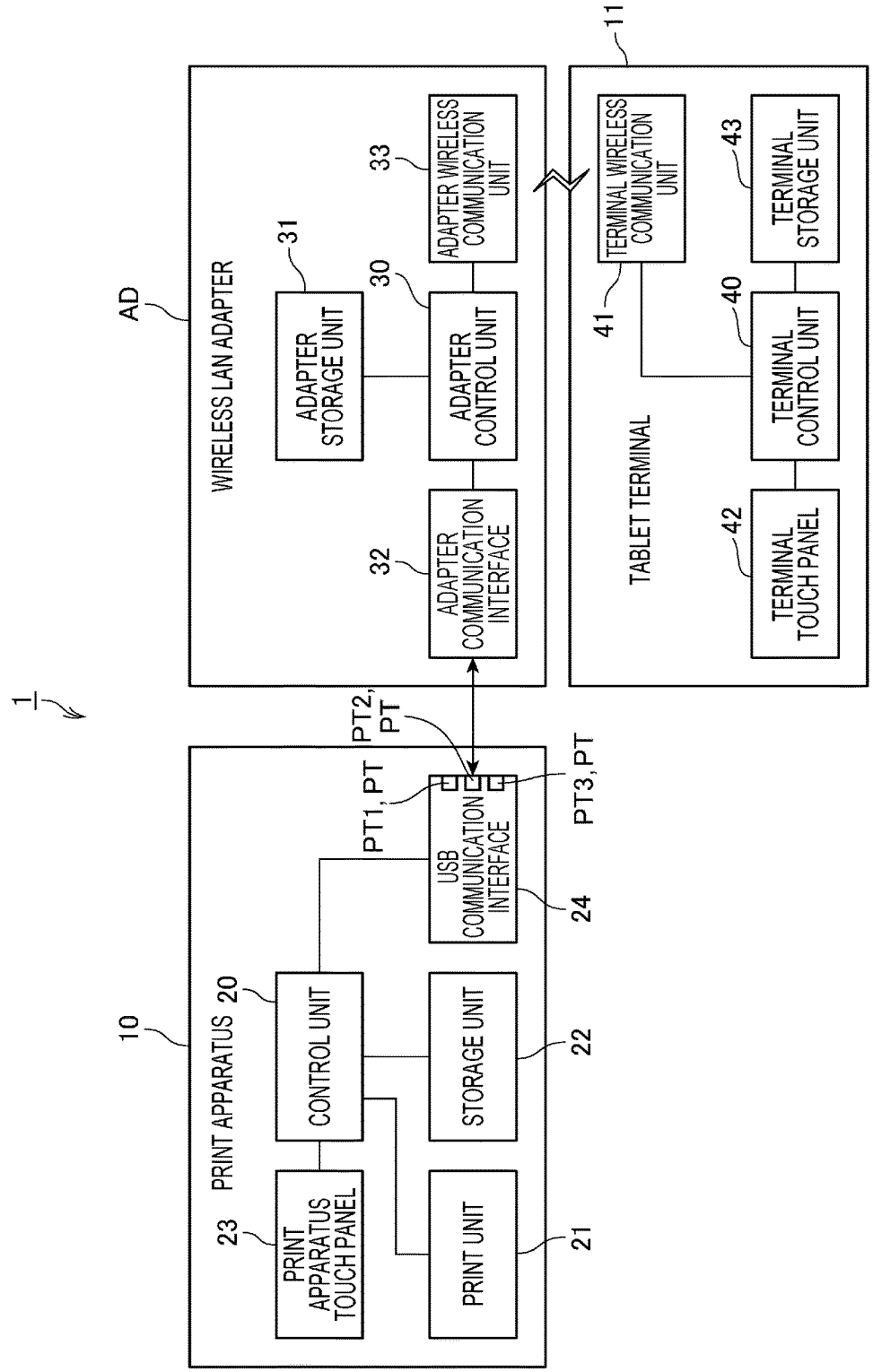
FIG. 1 is a block diagram illustrating a functional configuration of each device of the print system according to the present embodiment.

Hereinafter, at least one of the embodiments of the invention will be described with reference to the drawings.

FIG. 1 is a block diagram illustrating a functional configuration of each device of the print system 1 according to the present embodiment.

As illustrated in FIG. 1, the print system 1 includes a print apparatus 10 and a tablet terminal 11 functioning as a host computer for the print apparatus 10.

The print system 1 is a system in which the print apparatus 10 executes printing under the control of the tablet terminal 11. The print system 1 is provided at a checkout counter of a retail shop such as a supermarket or a convenience store or a store such as a restaurant such as a pub or a coffee shop, and issues a receipt according to accounting at the checkout counter.

The print apparatus 10 is an apparatus including a function of accommodating a print medium and printing on a print medium.

As illustrated in FIG. 1, the print apparatus 10 includes a control unit 20, a print unit 21, a storage unit 22, a print apparatus touch panel 23, and an USB communication interface 24.

The control unit 20 includes at least one CPU (at least one processor), at least one ROM, at least one RAM, other peripheral circuits, and the like, and controls the print apparatus 10. The control unit 20 controls each unit of the print apparatus 10 by cooperation of hardware and software such as reading and execution of the program stored in the ROM by the CPU and signal processing by a control circuit.

The print unit 21 includes mechanisms relating to printing on a print medium, such as a transport mechanism for transporting a print medium accommodated in the print apparatus 10 and a print mechanism for printing an image on a print medium by a printhead. The print unit 21 operates various mechanisms and prints an image on a print medium under the control of the control unit 20.

The storage unit 22 includes a nonvolatile memory and stores various kinds of information.

The print apparatus touch panel 23 is a touch panel provided in a casing of the print apparatus 10. The print apparatus touch panel 23 includes a display panel such as a liquid crystal display panel and a touch sensor provided to overlap the display panel. The display panel displays various images under the control of the control unit 20. The touch sensor detects touch operations and outputs the detected touch operations to the control unit 20. The control unit 20 executes processing corresponding to the touch operation by a user based on input from the touch sensor.

The USB communication interface 24 includes an interface board including a configuration related to communication by an USB such as an USB controller which performs communication according to USB specifications. The USB communication interface 24 includes a plurality of (three in the present embodiment) USB port PT1 (connection unit, connector), USB port PT2 (connection unit, connector), and USB port PT3 (connection unit, connector). Hereinafter, in a case where USB port PT1, USB port PT2, and USB port PT3 are not distinguished from each other, they are expressed as "USB ports PT".

The USB communication interface 24 communicates with an USB device connected to USB ports PT under the control of the control unit 20.

A wireless LAN adapter AD (wireless communication adapter) can be connected to the USB communication interface 24 of the print apparatus 10 as an USB device.

The wireless LAN adapter AD is an external adapter including a function of wirelessly communicating according to a predetermined wireless communication standard (in present example, it is assumed that it is Wi-Fi (registered trademark)) corresponding to the wireless LAN.

As illustrated in FIG. 1, the wireless LAN adapter AD includes an adapter control unit 30, an adapter storage unit 31, an adapter communication interface 32, and an adapter wireless communication unit 33.

The adapter control unit 30 includes at least one CPU (at least one processor), at least one ROM, at least one RAM, other peripheral circuits, and the like, and controls the wireless LAN adapter AD. The adapter control unit 30 controls the wireless LAN adapter AD by hardware and software functions such as program execution by the CPU and signal processing by the control circuit.

The adapter storage unit 31 includes a nonvolatile memory and stores various kinds of information.

The adapter communication interface 32 includes an interface board having a configuration related to communication by an USB such as an USB connector and an USB controller which performs communication according to USB specifications. The adapter communication interface 32 performs communication according to USB specifications under the control of the adapter control unit 30. The wireless LAN adapter AD is connected to the print apparatus 10 by the USB connector of the adapter communication interface 32 of the wireless LAN adapter AD being connected to any of the USB ports PT of the USB communication interface 24 of the print apparatus 10.

The adapter wireless communication unit 33 includes an antenna, a modulation/demodulation unit which modulates transmission data or demodulates reception data, and an RF unit which transmits the transmission data after modulation as electric wave via the antenna or outputs the signal included in electric wave received via the antenna to the modulation/demodulation unit, and the like. Under the control of the adapter control unit 30, the adapter wireless communication unit 33 wirelessly communicates with an external apparatus (including the tablet terminal 11) according to a predetermined wireless communication standard corresponding to the wireless LAN.

There are IEEE802.11b, IEEE802.11g, and IEEE802.11a as examples of wireless communication standards corresponding to the wireless LAN adapter AD. Hereinafter, IEEE802.11b and IEEE802.11g are expressed collectively as "IEEE802.11b/g". IEEE802.11b/g is a communication standard which can use "2.4 GHz" band and IEEE802.11a is a communication standard which can use "5 GHz" band.

The tablet terminal 11 is a terminal type (plate shape) of a tablet provided with a terminal touch panel 42 in which a touch panel is provided on a wide area of a front surface thereof.

As illustrated in FIG. 1, the tablet terminal 11 includes a terminal control unit 40, a terminal wireless communication unit 41, a terminal touch panel 42, and a terminal storage unit 43.

The terminal control unit 40 includes a CPU, a ROM, a RAM, other peripheral circuits, and the like, and controls the tablet terminal 11. The terminal control unit 40 controls the tablet terminal 11 by hardware and software functions such as program execution by the CPU and signal processing by a signal processing circuit.

The terminal wireless communication unit 41 wirelessly communicates with an external apparatus (including wireless LAN adapter AD) according to a predetermined wireless communication standard under the control of the terminal control unit 40.

The terminal touch panel 42 includes a display panel such as a liquid crystal display panel and a touch sensor provided to overlap the display panel. The display panel displays various images under the control of the terminal control unit 40. The touch sensor detects a touch operation and outputs detected touch operation to the terminal control unit 40. The terminal control unit 40 executes processing corresponding to the touch operation by the user based on the input from the touch sensor.

The terminal storage unit 43 includes a memory and stores various kinds of information.

As described above, the wireless LAN adapter AD can be connected to the print apparatus 10.

In a case where the print apparatus 10 performs wireless communication via the connected wireless LAN adapter AD, it is necessary to perform wireless communication according to the wireless communication standard in the region where the print apparatus 10 is installed. For example, regarding wireless communication by the wireless LAN adapter AD connected to the print apparatus 10, a usable channel differ from region to region according to a predetermined standard in the region where the print apparatus 10 is provided. Therefore, in a case where wirelessly communication is performed via the wireless LAN adapter AD, the print apparatus 10 needs to perform wireless communication using a channel usable in the region where the print apparatus 10 is installed. The channel is obtained by an electric wave band related to wireless communication being divided according to a channel width including a predetermined frequency band about a predetermined frequency. In the following description, individual channel is indicated by a combination of "ch" and numerals such as ch1 and ch2.

Specifically, channels usable when communicating in an ad hoc mode with respect to each of IEEE802.11b/g and IEEE802.11a are different according to the region where the print apparatus 10 is provided. For example, it is assumed that there are three regions of first region T1, second region T2, and third region T3 as regions. In this case, channels which can be used in the case of IEEE802.11b/g differ from region to region, such as ch1 to ch11 in first region T1, ch1 to ch12 in second region T2, ch1 to ch13 in third region T3.

Based on this, the wireless LAN adapter AD is designed to perform wireless communication according to a regional standard of a destination according to the destination region. The destination region is a region where the wireless LAN adapter AD is supposed to be sold and used, regardless of where the wireless LAN adapter AD is manufactured.

Therefore, in a case where the print apparatus 10 installed in region 1 performs wireless communication via the wireless LAN adapter AD, the region of the destination of the wireless LAN adapter AD to be used needs to be region 1.

In addition, as described above, the print apparatus 10 includes a plurality of USB ports PT (a plurality of connection units, a plurality of connectors). Therefore, in the print apparatus 10, there is a possibility that a plurality of wireless LAN adapters AD are in a state of being connected to the wireless LAN adapter AD being connected to each of the plurality of USB ports PT.

Based on the above, the print apparatus 10 according to the present embodiment executes the following processing.

A flowchart FA of FIG. 2 is a flowchart illustrating the processing executed by the print apparatus 10 when the power of the print apparatus 10 is turned on and the print apparatus 10 is started. In other words, at the time of start, the print apparatus 10 executes the processing illustrated in the flowchart FA.

The print apparatus 10 executes the processing indicated by the flowchart FA, for example, in the initial processing performed at the time of start of the print apparatus 10.

As illustrated in FIG. 2, the control unit 20 of the print apparatus 10 determines whether or not the wireless LAN adapter AD is connected to the plurality of USB ports PT (step SA1).

In step SA1, the control unit 20 determines whether or not the wireless LAN adapter AD is in a state being connected to the plurality of USB ports PT, for example, by the following method. For example, the control unit 20 communicates with each of the USB devices connected to the USB port PT according to an USB and detects (acquires) a vendor ID and a product ID from each USB device. As well known, the vendor ID and the product ID are codes allocated to the USB device, and an USB host (print apparatus 10 in the present embodiment) can determine the type of the USB device by the combination of these IDs. The control unit 20 determines the type of each USB device based on the vendor ID and the product ID acquired from each USB device connected to the USB port PT. In a case where the control unit 20 detects an USB device whose type is the wireless LAN adapter AD and detects a plurality of vendor IDs or product IDs, the control unit 20 determines a case where the wireless LAN adapter AD is connected to the plurality of USB ports PT.

In step SA1, the method of determining whether or not the wireless LAN adapter AD is in a state of being connected to the plurality of USB ports PT is not limited to the illustrated method, and any method may be used.

In a case where the wireless LAN adapter AD is not connected to the plurality of USB ports PT (step SA1: NO), that is, in a case where the wireless LAN adapter AD is connected to one USB port PT, or in a case where all the wireless LAN adapters AD are not connected to the print apparatus 10, the control unit 20 ends the processing.

In a case where the wireless LAN adapter AD is in a state of being connected to the plurality of USB ports PT (step SA1: YES), the control unit 20 executes the use adapter control processing (step SA2) and ends the processing.

The flowchart FB of FIG. 3 is a flowchart illustrating details of the use adapter control processing.

As illustrated in the flowchart FB of FIG. 3, in the use adapter control processing, the control unit 20 communicates with each of the plurality of connected wireless LAN adapters AD to acquire regional information from each of the wireless LAN adapters AD (Step SB1). Hereinafter, the processing of step SB1 will be described in detail.

The regional information is identification information indicating a destination region of the wireless LAN adapter AD. For example, the regional information is identification information indicating Japan in a case where the destination region is Japan, and identification information indicating North America in a case where the destination region is North America. The regional information may be information indicating that it does not indicate a specific region and is not any region.

The regional information is stored in advance in the adapter storage unit 31 of the wireless LAN adapter AD.

In step SB1, the control unit 20 communicates with each adapter control unit 30 of the wireless LAN adapter AD connected to the print apparatus 10 and requests transmission of regional information. According to the request, the adapter control unit 30 of the wireless LAN adapter AD acquires the regional information from the adapter storage unit 31 and transmits the acquired regional information to the print apparatus 10. The control unit 20 of the print apparatus 10 controls the USB communication interface 24 to receive and acquire the regional information transmitted by the wireless LAN adapter AD.

After the regional information is acquired from each of the connected wireless LAN adapters AD, the control unit 20 compares the acquired regional information items to each other and determines whether or not each regional information indicating the region are the same (step SB2). In step SB2, the control unit 20 compares the value of the regional information (=identification information indicating the destination region), and if the values of all regional information items are the same, it is determined that each regional information indicating the region are the same. If there is at least one regional information having a different value, the control unit 20 determines that each regional information indicating the region are not the same. In step SB2, if each regional information is information indicating that it is not in any region, the control unit 20 determines that each regional information indicating the region are not the same.

In a case where the each regional information indicating the region are not the same (step SB2: NO), the control unit 20 sets all the wireless LAN adapters AD to be in an unusable state (step SB3).

Specifically, the control unit 20 unloads a device driver for controlling each wireless LAN adapter AD. The control unit 20 maintains the unloaded state of the device driver in the case of configuration in which the device driver is not automatically loaded at the time of start of the print apparatus 10. Accordingly, allocation of resources to all the wireless LAN adapters AD is stopped, supply of electric power to all the wireless LAN adapters AD is stopped, and operations of all the wireless LAN adapters AD are stopped.

The allocation of a resource to the wireless LAN adapter AD means that a storage area is secured to the RAM and other memories with respect to the device driver for controlling the wireless LAN adapter AD or a process generated by the device driver is allocated to the CPU.

Next, the control unit 20 controls the print unit 21 to print the following information on the print medium. (1) information indicating that the destination region (region indicated by regional information of the wireless communication adapter) of the wireless LAN adapter AD connected to the print apparatus 10 is different from each other, (2) information indicating that all the wireless LAN adapters AD are in an unusable state, (3) information indicating that it is necessary to restart the print apparatus 10 in a state where one wireless LAN adapter AD is connected to the print apparatus 10 in order to resume the wireless communication, and (4) information corresponding to information indicating a port number of the USB port PT connected to the wireless LAN adapter AD and a destination (region indicated by regional information) of the wireless LAN adapter AD with respect to each wireless LAN adapter AD.

FIG. 4 illustrates an example of information printed on the print medium in step SB4.

On the other hand, in a state where the acquired regional information items indicating the region are the same in step SB2 (step SB2: YES), the control unit 20 executes connecting state management processing (step SB5) and ends the processing. The connecting state management processing will be described below.

As described above, in the print apparatus 10 according to the present embodiment, in a case where a plurality of wireless LAN adapters AD are connected, in a case where the regional information items stored in the plurality of wireless LAN adapters AD indicating the region (=destination region) are different from each other, all the wireless LAN adapters AD is set to be in an unusable state. Accordingly, the following effects are obtained. In other words, in a case where the wireless LAN adapters AD having different destination regions are connected to the print apparatus 10, there is a high possibility that any of the wireless LAN adapters AD is erroneously connected and the wireless LAN adapter AD which matches the destination region and the region where the print apparatus 10 is installed cannot be selected. Based on this, by all the wireless LAN adapters AD being set to be in an unusable state, performance of the wireless communication in an aspect in violation a standard can be reliably prevented.

In addition, the print apparatus 10 according to the present embodiment prints the predetermined information described above when all the wireless LAN adapters AD are set to be in an unusable state by regional information indicating the region being different from each other. Accordingly, the following effects are obtained. In other words, by confirming the information printed on the print medium by visual recognition, the user can quickly recognize that the print apparatus is in a state of being not capable of communicating with an external apparatus via the wireless LAN adapter AD, the reason thereof, and a state where the print apparatus can restart. In addition, the user can easily recognize the destination of the wireless LAN adapter AD connected to each USB port PT by confirming the information printed on the print medium by visual recognition. Based on these recognitions, the user can execute a suitable processing such as disconnection of the wireless LAN adapters AD having different destinations, restart of the print apparatus 10, or the like.

A flowchart FC of FIG. 5 is a flowchart illustrating the details of the connecting state management processing.

As illustrated in the flowchart FC of FIG. 5, in the connecting state management processing, the control unit 20 communicates with each of the plurality of connected wireless LAN adapters AD, and the wireless communication standard (information related to wireless communication function, frequency band, electric wave reaching distance, electric wave intensity, or the like) corresponding to the wireless LAN adapters AD is acquired with respect to each of the wireless LAN adapters AD (step SC1).

Next, the control unit 20 acquires function of each wireless LAN adapter AD based on the wireless communication standard of each of the plurality of connected wireless LAN adapters AD (step SC2).

In the present embodiment, the function of the wireless LAN adapter AD includes at least "frequency band corresponding to wireless LAN adapter AD".

In step SC2, in a case where the wireless communication standard of the wireless LAN adapter AD is IEEE802.11b/g, the control unit 20 acquires "2.4 GHz" band which is a frequency band corresponding to the wireless LAN adapter AD, as a function of the wireless LAN adapter AD.

In addition, in a case where the wireless communication standard of the wireless LAN adapter AD is IEEE802.11b/g and IEEE802.11a, the control unit 20 acquires "2.4 GHz" band and "5 GHz" band which are frequency bands corresponding to the wireless LAN adapter AD, as a function of the wireless LAN adapter AD.

Next, the control unit 20 determines a higher function wireless LAN adapter AD (step SC3) by comparison of the functions of the wireless LAN adapters AD acquired in step SC2 with respect to the plurality of connected wireless LAN adapters AD with each other. Hereinafter, processing of step SC3 will be described in detail.

In step SC3, the control unit 20 determines the wireless LAN adapter AD having the larger number of corresponding frequency bands as the higher function wireless LAN adapter AD. For example, it is assumed that the frequency band corresponding to one wireless LAN adapter AD is "2.4 GHz" band and the frequency bands corresponding to the other wireless LAN adapters AD are "2.4 GHz" band and "5 GHz" band. In this case, the control unit 20 determines the other wireless LAN adapters AD as the higher function wireless LAN adapter AD.

The reason why the control unit 20 determines the wireless LAN adapter AD having the larger number of corresponding frequency bands as the higher function wireless LAN adapter AD is as follows.

In other words, in the present embodiment, in a case where there are a plurality of frequency bands corresponding to the wireless LAN adapter AD connected to the print apparatus 10, the user can select the frequency band to be used by predetermined means. The fact that the number of corresponding frequency bands is large for the wireless LAN adapter AD means that there are many candidates for frequency bands that the user can select. The user can select a suitable frequency band based on the environment of the place where the print apparatus 10 is installed and the characteristics related to communication required for the print apparatus 10, as the number of frequency band candidates selectable by the user increases. Based on the above, the control unit 20 determines the wireless LAN adapter AD having the larger number of corresponding frequency bands as the higher function wireless LAN adapter AD.

In a case where the number of corresponding frequency bands is the same for each of the plurality of wireless LAN adapters AD, the control unit 20 determines the higher function wireless LAN adapter AD by reflecting the electric wave reaching distance and the electric wave intensity of each wireless LAN adapter AD. Specifically, the electric wave reaching distance and the electric wave intensity are different for each type of wireless LAN adapters AD. Based on this, a table corresponding to information indicating the model, information indicating the electric reaching distance of the wireless LAN adapter AD, and information indicating electric wave intensity of the wireless LAN adapter AD is stored in the storage unit 22 of the print apparatus 10 in advance for each model of the wireless LAN adapter AD. The electric wave reaching distance and the electric wave intensity for each model may use those that the manufacturer of the wireless LAN adapter AD publishes as the specification of the product, or may be based on the result of tests or simulations. The control unit 20 determines the model of the wireless LAN adapter AD based on the vendor ID and the product ID of the wireless LAN adapter AD for each of the plurality of connected wireless LAN adapters AD. Next, the control unit 20 acquires the electric wave reaching distance and the electric wave intensity for each of the plurality of connected wireless LAN adapters AD based on the table described above. Next, the control unit 20 compares the electric wave reaching distance and electric wave intensity of each of the plurality of connected wireless LAN adapters AD, and determines a higher function wireless LAN adapter AD. The control unit 20 may be configured to determine a higher function wireless LAN adapter AD based on either one of the electric wave reaching distance and the electric wave intensity, but not both.

The method of determining the higher function wireless LAN adapter AD among the plurality of connected wireless LAN adapters AD is not limited to the method described above. For example, the control unit 20 may be configured to use the electric wave reaching distance or the electric wave intensity to determine a higher-function wireless LAN adapter AD without using the corresponding number of frequency bands. In other words, any method may be used as long as the wireless LAN adapter AD having high communication stability, high communication efficiency, and the like is determined as a higher function wireless LAN adapter AD.

In the following description, in step SC3, the control unit 20 expresses the higher function wireless LAN adapter AD as "high function adapter" and the wireless LAN adapter AD other than the high function adapter as "low-function adapter" among the connected wireless LAN adapters AD.

After the high function adapter is determined in step SC3, the control unit 20 sets the high function adapter to be in a usable state (step SC4). Specifically, the control unit 20 loads a device driver for controlling the high function adapter. In a case where the device driver is configured to be automatically loaded at the time of start of the print apparatus 10, the control unit 20 maintains a state where the device driver for controlling the high function adapter is loaded. The control unit 20 operates the high function adapter by the function of the loaded device driver. The operation of the high function adapter means a state where the high function adapter can be controlled by the control unit 20 and the print apparatus 10 is in a state of being capable of communicating with an external apparatus via the high function adapter.

Next, the control unit 20 sets the low function adapter to be in an unusable state (step SC5). Specifically, the control unit 20 unloads a device driver for controlling the low function adapter. In a case where the device driver is not automatically loaded at the time of start of the print apparatus 10, the control unit 20 maintains a state where the device driver for controlling the low function adapter is unloaded. The control unit 20 stops the allocation of a resource to the low function adapter by unloading the device driver for controlling the low function adapter. The supply of power to the low function adapter is stopped and the low function adapter is set in a state of being not operated by the device driver for controlling the low function adapter being unloaded.

As described above, in the present embodiment, in a case where the regions of the destinations of the plurality of connected wireless LAN adapters AD are the same, the print apparatus 10 performs the connecting state management processing, only the high function adapter is set to be in a usable state, and a low function adapter other than the high function adapter is set to be in an unusable state. Accordingly, the following effects are obtained.

In a case where a plurality of wireless LAN adapters AD are connected to the print apparatus 10 and each of the plurality of wireless LAN adapters AD is set to be in a usable state to transmit and receive electric waves, there are the following problems. In other words, electric waves transmitted and received by the plurality of wireless LAN adapters AD causes electric wave interference, and thus there is a possibility that the communication with the external apparatus via the wireless LAN adapter AD may be adversely affected. In addition, transmission and reception of unnecessary electric waves (for example, transmission of electric waves superimposed with a response request signal periodically performed to detect a communicable external apparatus) are performed by any of the plurality of wireless LAN adapters AD and there is a possibility of using the electric wave band unnecessarily. On the other hand, in the present embodiment, in a case where several wireless LAN adapters AD are connected to the print apparatus 10, since one wireless LAN adapter AD is set to be in a usable state, occurring of the problem described above can be prevented.

Particularly, in this embodiment, since a higher function wireless LAN adapter AD can be set to be in a usable state among the plurality of wireless LAN adapters AD, the print apparatus 10 can communicate with an external apparatus via a higher function wireless LAN adapter AD.

Further, since the allocation of a resource to the low function adapters is stopped, among the plurality of connected wireless LAN adapters AD, unnecessary consumption of a resource can be prevented. In addition, the processing load of the CPU and the consumption of memory can be suppressed.

Further, since the supply of electric power to the low function adapter is stopped among the plurality of connected wireless LAN adapters AD, unnecessary consumption of electric power can be prevented and power saving can be realized.

Next, when one wireless LAN adapter AD is connected in a usable state while being started, the operation of the print apparatus 10 will be described.

The flowchart FD of FIG. 6 is a flowchart illustrating the operation of the print apparatus 10 when one wireless LAN adapter AD is connected in a usable state.

At the starting point of the flowchart FD of FIG. 6, one wireless LAN adapter AD is connected to the print apparatus 10, and the wireless LAN adapter AD can be set in a usable state.

As illustrated in FIG. 6, the control unit 20 of the print apparatus 10 monitors whether or not the wireless LAN adapter AD is newly connected to any of the USB ports PT (step SD1). In a case where the wireless LAN adapter AD is newly connected, the plurality of wireless LAN adapters AD is set to be in a state of being connected to the print apparatus 10.

In a case where it is detected that the wireless LAN adapter AD is newly connected (step SD1: YES), the control unit 20 executes the use adapter control processing (step SD2) and returns the processing procedure to step SD1.

As described above, when the wireless LAN adapters AD having different destination regions are set to be in a state of being connected to the use adapter control processing being executed, these wireless LAN adapters AD are set to be in an unusable state, and thus performance of the wireless communication can be prevented in violation of a standard.

As described above, the print apparatus 10 according to the present embodiment includes a print unit 21 which prints on a print medium, a plurality of USB ports PT (connection units, connectors) which can connect the wireless LAN adapter AD, and a control unit 20 which acquires regional information items from a plurality of connected wireless LAN adapters AD in a case where the wireless LAN adapter AD is connected to a plurality of USB ports PT, compares acquired regional information items to each other, and executes the use adapter control processing in which all the wireless communication adapter are set to be in an unusable state in a case where regional information indicating the region are different from each other.

Here, in a case where the wireless LAN adapters AD having different destination regions are connected to the print apparatus 10, there is a high possibility that any of the wireless LAN adapters AD is erroneously connected, and the wireless LAN adapter AD which matches the destination region and the region where the print apparatus 10 is installed cannot be selected. Based on this, according to the above configuration. In a case where the wireless LAN adapters AD having different destination regions are connected to the print apparatus 10, the print apparatus 10 can reliably prevents performance of the wireless communication in an aspect in violation of a standard by all the wireless LAN adapters AD being set to be in an unusable state. In other words, according to the above configuration, in response to a possibility that a plurality of wireless LAN adapters AD are connected with respect to the print apparatus 10 which can be connected to the wireless LAN adapter AD, the performance of the wireless communication can be suppressed in violation of a standard of region in which the print apparatus 10 is installed.

In addition, in the present embodiment, in a case where the wireless LAN adapter AD is set to be in an unusable state in the use adapter control processing, the control unit 20 controls the print unit 21 and since the regional information items of the plurality of wireless LAN adapters AD indicating the region are different from each other. Information indicating that the wireless LAN adapter AD is in an unusable state is printed on the print medium.

According to the configuration, a user can quickly recognize that the print apparatus 10 is in a state of being incapable of communicating with an external apparatus via the wireless LAN adapter AD by checking information printed on the print medium by visual recognition and reason thereof and can execute suitable processing such as disconnection of a wireless LAN adapter having different destination regions and restart of the print apparatus 10 based on the recognition.

In addition, in the present embodiment, at the time of start, the control unit 20 determines whether or not the wireless LAN adapter AD is connected to the plurality of USB ports PT, and in a case where it is determined that the wireless LAN adapter AD is in a state of being connected to the plurality of USB ports PT, the use adapter control processing is executed.

According to the configuration, in a case where the print apparatus 10 is started in a state where a plurality of wireless LAN adapters AD is connected thereto, the print apparatus 10 executes the use adapter control processing at the time of start, and performance of the wireless communication can be prevented in an aspect in violation of a standard in a predetermined case.

In addition, in the present embodiment, the control unit 20 monitors whether or not the wireless LAN adapter AD is newly connected to the USB port PT while the wireless LAN adapter AD is connected to one USB port PT and may execute the use adapter control processing in a case of detecting that the wireless LAN adapter AD is newly connected.

According to the configuration, in a case where the wireless LAN adapter AD is newly connected to the print apparatus 10 while the print apparatus 10 is started, the performance of the wireless communication can be prevented in an aspect in violation of a standard in a predetermined case by the use adapter control processing being executed at the time of the connection.

In addition, in the present embodiment, in a case where the wireless LAN adapters AD of which regional information indicating the region are the same are connected, the control unit 20 set any one of the wireless LAN adapters AD to be in a usable state and the other wireless LAN adapters AD to be in an unusable state.

According to the configuration, in the print apparatus 10, occurring of a problem due to the connection of a plurality of wireless LAN adapters AD in an unusable state can be prevented.

In addition, in the present embodiment, in a case where the wireless LAN adapters AD of which regional information indicating the region are the same are in connected states, the control unit 20 set one higher function wireless LAN adapter AD to be in a usable state and the other wireless LAN adapters AD to be in an unusable state.

According to the configuration, the print apparatus 10 can communicate with an external apparatus via the high function wireless LAN adapter AD suitable for communication.

In addition, in the present embodiment, the control unit 20 stops the supply of electric power to the wireless LAN adapter AD in a case where the wireless LAN adapter AD is set to be in an unusable state.

According to the configuration, unnecessary power consumption can be suppressed and power saving can be realized.

In addition, in the present embodiment, in a case where the wireless LAN adapter AD is set to be in an unusable state, the control unit 20 stops the allocation of the resource to the wireless LAN adapter AD.

According to the configuration, consumption of unnecessary resource can be suppressed.

The embodiment described above merely describes one aspect of the invention, and can be arbitrarily modified and applied within the scope of the invention.

For example, in the embodiment described above, the wireless LAN adapter AD is an USB device and communicates with the print apparatus 10 according to USB specifications. However, the communication protocol used for communication between the wireless LAN adapter AD and the print apparatus 10 may be not limited to the USB.

In addition, for example, in a case where the method for controlling a print apparatus 10 described above (method for controlling print apparatus) is realized by using a computer included in the print apparatus 10 or an external apparatus connected to the print apparatus 10, the invention can be also configured by an aspect of a program executed by a computer to realize the method, a recording medium in which the program is recorded so as to be readable by a computer, or a transmission medium for transmitting the program. As the recording medium, a magnetic or optical recording medium or a semiconductor memory device can be used. Specifically, the recording medium is a portable type recording medium such as a flexible disk, a Hard Disk Drive (HDD), a Compact Disk Read Only Memory (CD-ROM), a Digital Versatile Disk (DVD), a Blu-ray (registered trademark) Disc, a magneto-optical disk, a flash memory, and a card Type recording medium, or a fixed type recording medium, as an example. In addition, the recording medium may be a nonvolatile storage device such as a Random Access Memory (RAM), a Read Only Memory (ROM), and an HDD which is an internal storage device included in the print apparatus 10 or an external apparatus connected to the print apparatus 10.

In addition, each functional block described with reference to the drawings can be arbitrarily realized by hardware and software, and does not suggest a specific hardware configuration.

What is claimed is:

1. A print apparatus configured to be able to connect a plurality of wireless communication adapters, the apparatus comprising:
    a print mechanism configured to print on a print medium;
    a plurality of connectors to which the wireless communication adapters configured to be able to be connected; and
    a processor configured to
        acquire regional information of the plurality of connected wireless communication adapters in a case where the wireless communication adapters are configured to be able to store the regional information and the processor detects that the wireless communication adapters are in a state of being connected to the plurality of connectors, and
        execute processing which sets all the wireless communication adapters to be in an unusable state in a case where any one of a plurality of items of the regional information is different from others, based on a result of comparison of the acquired regional information items to each other, wherein the plurality of items of the regional information indicate respective destination regions where the plurality of wireless communication adaptors are supposed to be sold and used.

2. The print apparatus according to claim 1,
    wherein in the processing, in a case where the wireless communication adapter is set to be in an unusable state, the processor controls the print mechanism to print information indicating that the wireless communication adapter cannot be used since the regional information items of the plurality of wireless communication adapters are different from each other on the print medium.

3. The print apparatus according to claim 1,
    wherein the processor executes the processing in a case of detecting that the wireless communication adapters are respectively in a state of being connected to the plurality of connectors at the time of start.

4. The print apparatus according to claim 1,
    wherein the processor monitors whether or not the wireless communication adapter is newly connected to the connector while the wireless communication adapter is in a state of being connected to one connector and executes the processing in a case of detecting that the wireless communication adapter is newly connected.

5. The print apparatus according to claim 1,
    wherein in a case where the processor detects that the plurality of wireless communication adapters having the same regional information are in a connected state, any of the wireless communication adapters is set to be in a usable state and the other wireless communication adapters are set to be in an unusable state.

6. The print apparatus according to claim 5,
    wherein in a case where the processor detects that the plurality of wireless communication adapters having the same regional information are in connected states, the processor acquires information related to a wireless communication function of each wireless communication adapter and sets one wireless communication adapter to be in a usable state and the other wireless communication adapters to be in an unusable state, based on a result of comparison of the acquired information items of the plurality of wireless communication adapters to each other.

7. The print apparatus according to claim 5,
    wherein in a case where the wireless communication adapter is set to be in an unusable state, the processor stops the supply of electric power to the wireless communication adapter.

8. The print apparatus according to claim 5,
    wherein in a case where the wireless communication adapter is set to be in an unusable state, the processor stops allocation of a resource to the wireless communication adapter.

9. A method for controlling a print apparatus configured to include a print mechanism configured to print on a print medium and a plurality of connectors to which a plurality of wireless communication adapters configured to able to be connected, the method comprising:
    acquiring regional information of the plurality of connected wireless communication adapters in a case where the wireless communication adapters configured to be able to store the regional information and it is detected that the wireless communication adapter is in a state of being connected to the plurality of connectors; and
    executing processing which sets all the wireless communication adapters to be in an unusable state in a case where any one of a plurality of items of the regional information is different from others, based on a result of comparison of the acquired regional information items to each other, wherein the plurality of items of the regional information indicate respective destination regions where the plurality of wireless communication adaptors are supposed to be sold and used.

10. The method for controlling a print apparatus according to claim 9, further comprising:
    controlling the print mechanism to print information indicating that the wireless communication adapter cannot be used since the regional information items of the plurality of wireless communication adapters are different from each other on the print medium, in a case where the wireless communication adapter is set to be in an unusable state, in the processing.

11. The method for controlling a print apparatus according to claim 9, further comprising:
    executing the processing in a case of detecting that the wireless communication adapters are respectively in a state of being connected to the plurality of connectors, at the time of start.

12. The method for controlling a print apparatus according to claim 9, further comprising:

monitoring whether or not the wireless communication adapter is newly connected to the connector while the wireless communication adapter is in a state of being connected to one connector; and executing the processing in a case of detecting that the wireless communication adapter is newly connected.

13. The method for controlling a print apparatus according to claim 9, further comprising:

setting any of the wireless communication adapters to be in a usable state and the other wireless communication adapters to be in an unusable state, in a case where it is detected that the plurality of wireless communication adapters having the same regional information are in a connected state.

14. The method for controlling a print apparatus according to claim 13, further comprising:

acquiring information related to a wireless communication function of each wireless communication adapter in a case where it is detected that the plurality of wireless communication adapters having the same regional information are in connected states; and setting one wireless communication adapter to be in a usable state and the other wireless communication adapters to be in an unusable state, based on a result of comparison of the acquired information items or the plurality of wireless communication adapters to each other.

15. The method for controlling a print apparatus according to claim 13, further comprising:

stopping the supply of electric power to the wireless communication adapter in a case where the wireless communication adapter is set to be in an unusable state.

16. The method for controlling a print apparatus according to claim 13, further comprising:

stopping allocation of a resource to the wireless communication adapter in a case where the wireless communication adapter is set to be in an unusable state.

17. A print apparatus configured to be able to connect a plurality of wireless communication adapters, the apparatus comprising:

a print mechanism configured to print on a print medium;

a plurality of connectors to which the wireless communication adapters configured to be able to be connected; and a processor configured to acquire regional information of the plurality of connected wireless communication adapters in a case where the wireless communication adapters are configured to be able to store the regional information and the processor detects that the wireless communication adapters are in a state of being connected to the plurality of connectors, and execute processing which sets an unusable state including the wireless communication adapters in which any one of a plurality of items of the regional information is different from others, based on a result of comparison of the acquired regional information items to each other, wherein the plurality of items of the regional information indicate respective destination regions where the plurality of wireless communication adaptors are supposed to be sold and used.

* * * * *